United States Patent
Hulbert et al.

(10) Patent No.: US 9,846,478 B1
(45) Date of Patent: Dec. 19, 2017

(54) ADAPTIVE POWER MANIPULATION OF FEDERATED STORAGE SYSTEMS

(71) Applicant: EMC Corporation, Hopkinton, MA (US)

(72) Inventors: Ben Hulbert, Cary, NC (US); Roko Peros, Holly Springs, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/753,510

(22) Filed: Jun. 29, 2015

(51) Int. Cl.
G06F 1/32 (2006.01)
G06F 3/06 (2006.01)
G06F 11/34 (2006.01)

(52) U.S. Cl.
CPC .......... *G06F 1/3275* (2013.01); *G06F 1/3293* (2013.01); *G06F 1/3296* (2013.01); *G06F 1/3268* (2013.01); *G06F 3/067* (2013.01); *G06F 3/0625* (2013.01); *G06F 3/0634* (2013.01); *G06F 3/0653* (2013.01); *G06F 3/0689* (2013.01); *G06F 11/34* (2013.01); *Y02B 60/1246* (2013.01); *Y02B 60/165* (2013.01)

(58) Field of Classification Search
CPC ...... G06F 11/34; G06F 1/3215; G06F 1/3268; G06F 3/0625; G06F 3/0634; G06F 3/0653; G06F 3/067; G06F 3/0689; G06F 1/34; G06F 1/3275; G06F 1/3296; G06F 1/3293; Y02B 60/1246; Y02B 60/165
See application file for complete search history.

(56) References Cited

U.S. PATENT DOCUMENTS

| | | | | |
|---|---|---|---|---|
| 5,452,277 | A * | 9/1995 | Bajorek | G06F 1/3215 360/69 |
| 8,688,908 | B1 | 4/2014 | Kopylovitz | |
| 9,195,508 | B1 * | 11/2015 | Blanding | G06F 9/5027 |
| 2009/0006877 | A1 * | 1/2009 | Lubbers | G06F 3/0625 713/323 |
| 2011/0191609 | A1 * | 8/2011 | Van Bokhoven | G06F 1/3206 713/310 |
| 2013/0185258 | A1 | 7/2013 | Bestler et al. | |
| 2013/0290470 | A1 | 10/2013 | Caradonna et al. | |
| 2013/0290598 | A1 * | 10/2013 | Fiske | G06F 3/0625 711/103 |
| 2014/0330793 | A1 * | 11/2014 | Chamness | G06F 17/30153 707/692 |
| 2015/0185797 | A1 * | 7/2015 | Cooper | G06F 1/28 713/340 |

* cited by examiner

*Primary Examiner* — Terrell Johnson
(74) *Attorney, Agent, or Firm* — BainwoodHuang

(57) ABSTRACT

A technique of automatically managing power consumption by predicting data storage utilization events based upon individual data storage drive utilization history, drive properties, client storage usage and behavior trends is described. The behavior trends may include customer actions, such as reduced weekend and holiday data storage system usage rates. The technique collects operational data and calculates statistical trends in utilization rates for each data storage drive, and for the overall data storage system. The technique automatically switches individual data storage drives to an appropriate power and performance level based upon predicted utilization demand, including shut down and restarts to reduce data storage system power consumption without adversely impacting data storage system performance.

19 Claims, 2 Drawing Sheets

ADAPTIVE POWER MANIPULATION OF FEDERATED STORAGE SYSTEMS

BACKGROUND

Data storage systems are arrangements of hardware and software that include one or more storage processors coupled to arrays of non-volatile storage devices, such as magnetic disk drives, electronic flash drives, and optical drives. The storage processors service storage requests, arriving from host machines ("hosts") which specify files or other data elements to be written, read, created or deleted, for example.

Data storage systems utilize electrical power to operate the electronic data storage systems, as well as for air handling and air conditioning systems to remove the heat generated by the operation of the data storage systems. Individual data storage drives in data storage systems may be accessed by a host at any time, and as a result the data storage drives may be left in a power-on state even during times when there are few or no data storage requests, in order to be available for host requests.

SUMMARY

Unfortunately, there are deficiencies with the above-described conventional approaches. Reducing the cost of electrical consumption in data storage systems without reducing host storage request response time is a benefit for data storage system managers. In the conventional approach to reducing electrical consumption in data storage devices, people who manage such data storage systems manually decide to turn off selected data storage drives based upon their experience with normal utilization trends for the data storage system as a whole, and for individual drives.

The conventional approach of manually turning off data storage drives to save money without sacrificing host storage request response time is difficult for data storage system managers to implement. For example, manual decisions made by data storage system managers tend to be made later than optimum due to a natural desire to keep the data storage system as available as possible for host storage requests. One reason for this is that the people who manage data storage systems do not have a statistically significant history of utilization variations for each individual one of a large set of data storage drives. Even variations in overall power consumption of a large data storage system are hard for a system manager to predict because of the many interacting conditions.

In contrast to the conventional approaches of reducing data storage drive electrical consumption, improved techniques for automatically predicting data storage drive utilization include continuous monitoring of the electrical usage rates of each individual data storage drive, as well as of the overall electrical usage rate of the overall data storage system. The techniques include using the monitoring data to create a model of data storage usage over time and statistical trend analysis of the monitoring data to predict a probable time when the data storage system, or individual drives of the system, can be either switched into a reduced power consumption mode, or shut down for a predicted low utilization period. The model includes client supplied limits and goals as well as data storage drive properties, data storage usage and behavior trends. For example, data storage drive utilization may typically be reduced during weekend periods for hosts that do not operate on weekends.

An embodiment of the improved techniques is directed to a method of managing power consumption in data storage systems. The method includes receiving, by a computing device from each of a set of storage devices of a data storage system, storage device access data over a selected period of time, and performing an aggregate utilization calculation operation to produce a common time period over which a calculated aggregate utilization of the storage device access data has a value less than a selected value. The method includes transmitting a signal to each of the multiple storage devices of the data storage system including instructions to switch to a reduced power consumption mode during the common time period.

Another embodiment of the improved techniques is directed to a method of automatically implementing power consumption configuration changes in data storage systems, including receiving, at specified intervals, a set of storage drive operational utilization data from each individual data storage drive representing a current storage usage percentage. The method includes storing the operational utilization data values in a memory location, and calculating, based upon a statistical behavior over time of the stored operational utilization data values, a model predicting utilization values over time periods for each one of the data storage drives. The method includes comparing a current storage drive operational utilization data value for each data storage drive to the model predictions of an expected utilization value for that drive to provide a difference value. The method includes changing the operating condition of a data storage drive that is currently in a full power operating mode into a low power state when both (1) the difference value for that data storage drive is less than a first selected value, and (2) the model prediction indicates a predicted utilization value period having a utilization value less than a second selected value. The method includes not changing the data storage drive into a low power state when the difference value for that data storage drive is more than the first selected value, and also not changing the data storage drive into a low power state when the model prediction indicates a predicted utilization value that is equal to or more than the second selected value.

Still another embodiment of the improved techniques is directed to a computer program product having a non-transitory computer readable medium which stores a set of instructions for monitoring a data storage system in an electronic device, the set of instructions causing a controller to perform a method of automatically implementing power consumption configuration changes in data storage systems. The method includes receiving storage drive operational utilization data values at specified intervals from each individual one of a set of data storage drives, where the utilization data represents a current system storage usage percentage. The method includes storing the operational utilization data values in a memory location, and calculating, based upon statistical behavior over time of the stored operational utilization data values, a model predicting expected utilization values over time periods for each individual one of the set of data storage drives. The method includes comparing a current storage drive operational utilization data value for each individual one of the set of data storage drives to the model predictions for that individual one to provide a difference value, and changing the operating condition of one of the set of data storage drives that is currently in a full power operating mode into a low power state when both (1) the difference value for that data storage drive is less than a first selected value and (2) the model prediction indicates a predicted low utilization value period having a utilization value less than a second selected value. The method also includes not changing the data storage drives into a low power state when the difference value for that data storage drive is more than the first selected value, and not changing the data storage drives into a low power state when the model prediction indicates a predicted utilization value that is equal to or more than the second selected value.

Still another embodiment of the improved techniques is directed to an electronic apparatus including a network interface, a memory, and processing circuitry coupled to the network interface, the memory and the buffer memory. The memory stores instructions for automatically implementing power consumption configuration changes in data storage systems which, when carried out by the processing circuitry, cause the processing circuitry to receive storage drive operational utilization data values at specified intervals from each of a set of data storage drives. The utilization data represents a current system storage usage percentage. The processing circuitry will store the operational utilization data values in a memory location, and calculate, based upon a statistical behavior over time of the stored operational utilization data values, a model predicting utilization values over time periods for each individual one of the set of data storage drives. The processing circuitry will compare a current storage drive operational utilization data value for each individual one of the set of data storage drives to the model predictions for that individual one to provide a difference value, and change the operating condition of one of the set of data storage drives that is currently in a full power operating mode to a low power state when the difference value for that data storage drive is less than a first selected value and the model prediction indicates a predicted low utilization period having a utilization value less than a second selected value. The processing circuitry will not change the data storage drive into a low power state when the difference value for that data storage drive is more than the first selected value, and will not change the data storage drive into a low power state when the model prediction indicates a predicted utilization value that is equal to or more than the second selected value.

The improved techniques for automatically managing power consumption in data storage systems may be combined in various ways and implemented with other variations that do not depart from the essential principles of the improvement.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Data storage system managers cannot accurately determine time dependent data storage system host data storage request volume due to variations in data storage system usage caused by large numbers of interacting and competing activities of a data storage system servicing hundreds of clients or hosts. In addition, the demand for data storage requests may increase or decrease rapidly on a minute to minute basis depending upon many factors such as time of day, holidays, weekends and vacation seasons. Thus a person attempting to manage power consumption in data storage systems cannot accurately determine when a data storage system may be in a low utilization rate period, and when the data storage drive could be set to a reduced power mode without impacting storage request response times. An automatic system for predicting when a data storage system may have its power consumption reduced, or e placed into a sleep state is needed.

Figure 1:
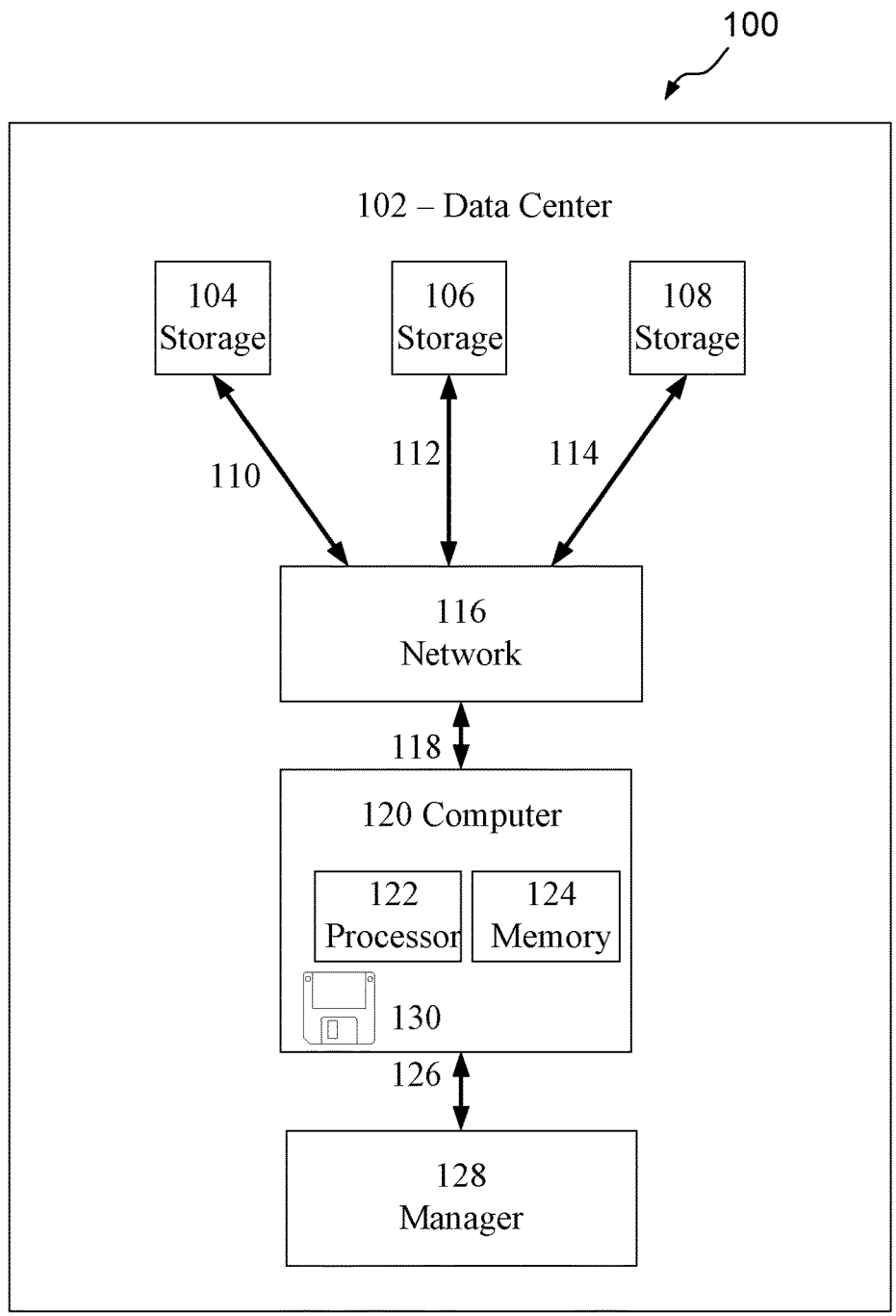
FIG. 1 is a block diagram of a data storage center with a set of storage drives using the improved techniques to reduce electrical consumption in data storage drives.

FIG. 1 is a block diagram of a data center 102 with a set of storage drives 104, 106 and 108 in an electronic environment 100 using the improved techniques. The data storage drives 104, 106 and 108 may be located in a single location, or may be in separate data storage locations. The described embodiment discusses a set of three data storage drives, but the embodiment is not so limited, and any number of data storage drives may be used. The data storage drives 104, 106 and 108 are connected by communication means 110, 112 and 114 respectively, to a network 116. The network 116 may be an internal bus line, an intranet, a local area network, the internet or other means of communication. A computer 120 may receive and transmit data over communication means 118 to the network 116. Computer 120 may include a processor 122, a memory 124 and a computer program product 130 having a non-transitory computer readable medium which stores a set of instructions for preforming operations in accordance with the improved techniques as discussed below. Computer 120 may also include a communication port for sending and receiving communications, for example with the storage drives and with a data storage system manager 128 or administrator via communications means 126. The communication means may variously comprise hard wired, wireless, RF, optical fiber or any means of data communication. The computer 120 may be any form of electronic device capable of sending and receiving data communications and performing data manipulations and calculations, such as a personal computer, processor, work station, laptop and other electronic devices.

In operation the processor 122 receives operational data from the data storage drives 104, 106 and 108 at selected time intervals. For example, data storage drives 104, 106 and 108 may be continuously sending operational data values to processor 122, or may send operational data values at regular time intervals such as every five minutes, or may send operational data values based upon a selected number of data operations, such as write requests or read requests, or in any other desired method. The operational data may include current values of data storage system usage, such as the number of data storage requests received as a function of time.

The processor 122 stores the received operational data in memory 124 and calculates a model for the time dependent trend of the operational data values. For example, storage location 104 might receive no host storage requests each night after midnight and before 6 AM, and on Saturdays, Sundays and holidays. Each storage location 104, 106 and 108 may have a different time dependent statistical model depending upon the type of hosts sending storage requests to that data storage drive.

The processor 122 may, for example, perform a statistical curve fit approximation to project a time when the data storage drive may either be receiving no storage requests, or will likely receive less than a selected number of storage requests. The time period over which the operational data is used in the statistical curve fit approximation may, for example, be hourly measurements taken over the past 12 months. In addition, the processor 122 may calculate statistical models for the overall operational data of the whole data storage system comprising data storage drives 104, 106 and 108, and may calculate a load balancing plan that shifts host storage requests from a low usage drive (such as 104 for example) to a moderate usage drive (such as 106) that has capacity to handle the additional data storage requests. The processor 122 may send a signal to storage drive 104 to switch to a reduced power consumption mode for a specific time period, and may further send a signal to the manager 128 informing the manager of the time period during which storage drive 104 will be a reduced power consumption mode. The manager 128 will be able to override the decision to switch storage drive 104 to a reduced power consumption mode.

Alternatively, the processor 122 may calculate that all of the storage drives 104, 106 and 108 are likely to be in a low utilization having a value that is less than a selected value, and thus the entire data center 102 is likely to be in a low utilization mode over a common time period. The processor 122 will then send a signal to each of the multiple storage drives to switch to a reduced power consumption mode. The reduced power consumption mode may be a full power-off mode or shut down, or it may be a reduced level of operation or sleep mode. The processor will send a signal to each of the storage drives 104, 106 and 108 at a time prior to the end of the common time period by an amount equal to a selected start up time period, to restart the storage drives.

The processor 122 may automatically implement power consumption configuration changes in a data storage system under the control of the non-transitory computer readable medium 130 which stores a set of instructions for monitoring a data storage system, the set of instructions causing the controller 122 to perform the method.

Figure 2:
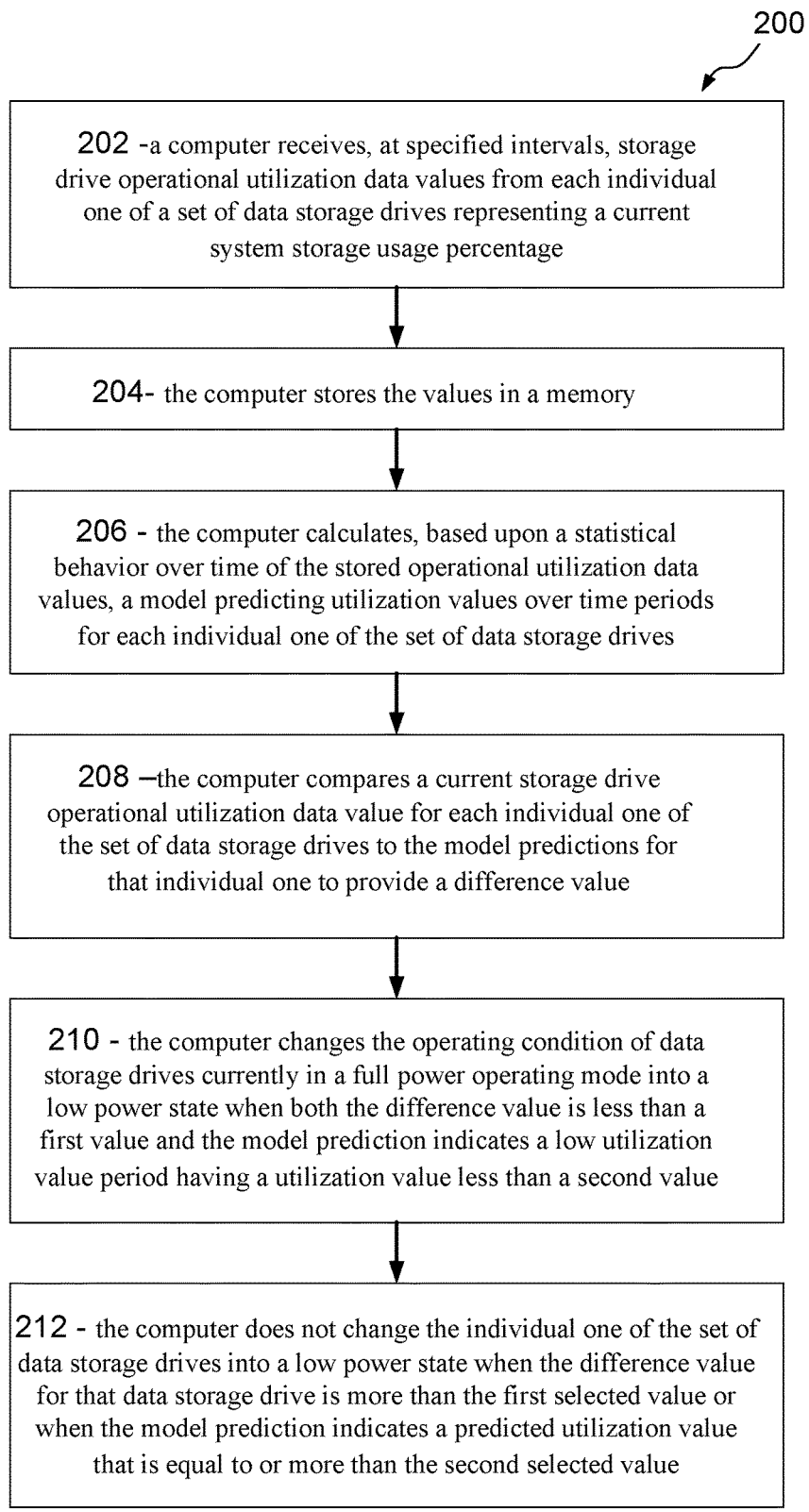
FIG. 2 is a flow chart illustrating a method of using the improved techniques to reduce electrical consumption in data storage drives.

FIG. 2 is a flow chart illustrating a method of automatically implementing power consumption configuration changes in data storage systems accordingly to the improved technique. At 202, a computer receives, at specified intervals, storage drive operational utilization data values from each individual one of a set of data storage drives representing a current system storage usage percentage. At 204 the computer stores the values in a memory.

At 206, the computer calculates, based upon a statistical behavior over time of the stored operational utilization data values, a model predicting utilization values over time periods for each individual one of the set of data storage drives. At 208, the computer compares a current storage drive operational utilization data value for each individual one of the set of data storage drives to the model predictions for that individual one to provide a difference value.

At 210, the computer changes the operating condition of an individual one of the set of data storage drives that is currently in a full power operating mode into a low power state when both the difference value for that data storage drive is less than a first selected value and the model prediction indicates a predicted low utilization value period having a utilization value less than a second selected value.

At 212, the computer does not change the individual one of the set of data storage drives into a low power state when the difference value for that data storage drive is more than the first selected value or when the model prediction indicates a predicted utilization value that is equal to or more than the second selected value.

In general the improved technique involves an electronic device continuously monitoring each data storage drive's usage and compiling historical data on drive usage to predict when it is practical to reduce electrical power consumption of data storage drives by automatically placing the low usage drives into a low power consumption mode, such as power off or sleep mode. The system automatically switches the data storage drives into sleep mode while notifying a system manager of the action.

The improved techniques reduce the cost of operating data storage drives by reducing electricity consumption without negatively impacting host data storage request response rates.

While various embodiments of the invention have been particularly shown and described, it will be understood by those skilled in the art that various changes in form and details may be made therein without departing from the spirit and scope of the invention as defined by the appended claims.

What is claimed is:

1. A method of automatically implementing power consumption configuration changes in data storage systems, comprising:
    receiving, by a computing device at specified intervals, a set of storage drive operational utilization data measured by monitoring each individual one of a set of data storage drives, the utilization data representing a current system storage usage percentage;
    storing, by the computing device, the operational utilization data values in a memory location;
    calculating, by the computing device, based upon a statistical behavior over time of the stored operational utilization data values, a model predicting utilization values over time periods for each individual one of the set of data storage drives;
    comparing, by the computing device, a current storage drive operational utilization data value for each individual one of the set of data storage drives to the model predictions of an expected utilization value for that individual one to provide a difference value;
    changing the operating condition of an individual one of the set of data storage drives that is currently in a full power operating mode into a low power state when both the difference value for that data storage drive is less than a first selected value and the model prediction indicates a predicted utilization value period having a utilization value less than a second selected value;
    not changing the individual one of the set of data storage drives into a low power state when the difference value for that data storage drive is more than the first selected value; and
    not changing the individual one of the set of data storage drives into a low power state when the model prediction indicates a predicted utilization value that is equal to or more than the second selected value,
    wherein the set of storage drive operational utilization data includes electrical usage data from each individual one of the set of data storage drives.

2. The method of claim 1, wherein changing the operating condition of an individual one of the set of data storage drives that is currently in a full power operating mode to a low power state includes changing the operating condition to a sleep state.

3. The method of claim 1, further including changing the operating condition of an individual one of the set of data storage drives that is currently in a low power state to a full power operating mode when the model prediction indicates a predicted utilization value that is equal to or more than the second selected value.

4. The method of claim 3, wherein changing the operating condition to a full power operating mode includes changing the operating condition at a time period prior to the time of the model prediction by a selected amount of time.

5. The method of claim 1, wherein receiving the storage drive operational utilization data values at specified intervals includes receiving the utilization data values continuously.

6. The method of claim 1, wherein calculating the model predicting expected utilization values for a first individual one of the set of data storage drives further includes determining if a second individual one of the set of data storage drives includes a predicted utilization value that is low enough for the first individual one of the set of data storage drives to be mirrored by the second individual one of the set of data storage drives, and changing the operating condition of the first individual one of the set of data storage drives to a power saving mode.

7. The method of claim 1 wherein the method further includes, prior to issuing a signal to change an operating condition of another one of the set of data storage drives, sending a signal to a system manager indicating a time period during which the other storage drive is to be in a reduced power consumption mode; and preventing the signal from changing the operating condition of the other storage drive to the reduced power consumption mode in response to the system manager overriding the signal to change the operating condition of the other storage drive.

8. A computer program product having a non-transitory computer readable medium which stores a set of instructions for monitoring a data storage system in an electronic device, the set of instructions causing a controller to perform a method of automatically implementing power consumption configuration changes in data storage systems, the method comprising:

receiving, at specified intervals, storage drive operational utilization data values measured by monitoring each individual one of a set of data storage drives, the utilization data representing a current system storage usage percentage;

storing the operational utilization data values in a memory location;

calculating, based upon a statistical behavior over time of the stored operational utilization data values, a model predicting expected utilization values over time periods for each individual one of the set of data storage drives;

comparing a current storage drive operational utilization data value for each individual one of the set of data storage drives to the model predictions for that individual one to provide a difference value;

changing the operating condition of an individual one of the set of data storage drives that is currently in a full power operating mode into a low power state when both the difference value for that data storage drive is less than a first selected value and the model prediction indicates a predicted low utilization value period having a utilization value less than a second selected value;

not changing the individual one of the set of data storage drives into a low power state when the difference value for that data storage drive is more than the first selected value; and not changing the individual one of the set of data storage drives into a low power state when the model prediction indicates a predicted utilization value that is equal to or more than the second selected value, wherein the set of storage drive operational utilization data includes electrical usage data from each individual one of the set of data storage drives.

9. The computer program product of claim 8, wherein changing the operating condition of an individual one of the set of data storage drives that is currently in a full power operating mode to a low power state includes changing the operating condition to a sleep state.

10. The computer program product of claim 8, further including changing the operating condition of an individual one of the set of data storage drives that is currently in a low power state to a full power operating mode when the model prediction indicates a predicted utilization value that is equal to or more than the second selected value.

11. The computer program product of claim 10, wherein changing the operating condition to a full power operating mode includes changing the operating condition at a time period prior to the time of the model prediction by a selected amount of time.

12. The computer program product of claim 8, wherein receiving, at specified intervals, the storage drive operational utilization data values includes receiving the utilization data values continuously.

13. The computer program product of claim 12, wherein calculating the model predicting expected utilization values for a first individual one of the set of data storage drives further includes determining if a second individual one of the set of data storage drives includes a predicted utilization value that is low enough for the first individual one of the set of data storage drives to be mirrored by the second individual one of the set of data storage drives, and changing the operating condition of the first individual one of the set of data storage drives to a power saving mode.

14. An electronic apparatus, comprising:

a network interface;

a memory; and processing circuitry coupled to the network interface, the memory and the buffer memory, the memory storing instructions for automatically implementing power consumption configuration changes in data storage systems which, when carried out by the processing circuitry, cause the processing circuitry to:

receive, at specified intervals, storage drive operational utilization data values measured by monitoring each individual one of a set of data storage drives, the utilization data representing a current system storage usage percentage;

store the operational utilization data values in a memory location;

calculate, based upon a statistical behavior over time of the stored operational utilization data values, a model predicting utilization values over time periods for each individual one of the set of data storage drives;

compare a current storage drive operational utilization data value for each individual one of the set of data storage drives to the model predictions for that individual one to provide a difference value;

change the operating condition of an individual one of the set of data storage drives that is currently in a full power operating mode into a low power state when both the difference value for that data storage drive is less than a first selected value and the model prediction indicates a predicted low utilization value period having a utilization value less than a second selected value;

not change the individual one of the set of data storage drives into a low power state when the difference value for that data storage drive is more than the first selected value; and not change the individual one of the set of data storage drives into a low power state when the model prediction indicates a predicted utilization value that is equal to or more than the second selected value, wherein the set of storage drive operational utilization data includes electrical usage data from each individual one of the set of data storage drives.

15. The apparatus of claim 14, wherein the change of operating condition of the individual one of the set of data storage drives that is in a full power operating mode to a low power state includes a change of operating condition to a sleep state.

16. The apparatus of claim 14, further including changing the operating condition of an individual one of the set of data storage drives that is currently in a low power state to a full power operating mode when the model prediction indicates a predicted utilization value that is equal to or more than the second selected value.

17. The apparatus of claim 16, wherein changing the operating condition to a full power operating mode includes changing the operating condition at a time period prior to the time of the model prediction by a selected amount of time.

18. The apparatus of claim 16, wherein the storage drive operational utilization data values are received continuously.

19. A method of automatically implementing power consumption configuration changes in data storage systems, comprising:

receiving, by a computing device at specified intervals, a set of storage drive electrical usage data measured by monitoring each individual one of a set of data storage drives;

storing, by the computing device, electrical usage data values in a memory location;

calculating, by the computing device, based upon a statistical behavior over time of the stored electrical usage data values, a model predicting electrical usage over time periods for each individual one of the set of data storage drives;

comparing, by the computing device, a current storage drive electrical usage data value for each individual one of the set of data storage drives to the model predictions of an expected electrical usage value for that individual one to provide a difference value; and changing the operating condition of an individual one of the set of data storage drives that is currently in a full power operating mode into a low power state when both the difference value for that data storage drive is less than a first selected value and the model prediction indicates a predicted electrical usage value period having a usage value less than a second selected value.

* * * * *